US012514786B2

(12) United States Patent
Yoshida

(10) Patent No.: US 12,514,786 B2
(45) Date of Patent: Jan. 6, 2026

(54) TRANSPORT CONTAINER

(71) Applicant: DAIKYO SEIKO, LTD., Sano (JP)

(72) Inventor: Takayuki Yoshida, Sano (JP)

(73) Assignee: DAIKYO SEIKO, LTD., Sano (JP)

( * ) Notice: Subject to any disclaimer, the term of this patent is extended or adjusted under 35 U.S.C. 154(b) by 8 days.

(21) Appl. No.: 18/691,677

(22) PCT Filed: Nov. 16, 2023

(86) PCT No.: PCT/JP2023/041181
§ 371 (c)(1),
(2) Date: Mar. 13, 2024

(87) PCT Pub. No.: WO2024/224666
PCT Pub. Date: Oct. 31, 2024

(65) Prior Publication Data

US 2025/0228742 A1 Jul. 17, 2025

(30) Foreign Application Priority Data

Apr. 28, 2023 (JP) ................................ 2023-074548

(51) Int. Cl.
*A61M 5/00* (2006.01)
*A61J 1/14* (2023.01)
*A61J 1/16* (2023.01)

(52) U.S. Cl.
CPC ............... *A61J 1/16* (2013.01); *A61J 1/1412* (2013.01)

(58) Field of Classification Search
CPC .... B65D 25/108; B65D 21/045; B65D 71/70; B65D 77/0446; B65D 81/2015; B65D 21/04; B65D 51/18; A61M 5/008; A61M 5/02; A61M 5/001; A61M 5/00; A61M 5/3202; A61M 2207/00; A61M 2209/06
(Continued)

(56) References Cited

U.S. PATENT DOCUMENTS

| | | | | |
|---|---|---|---|---|
| 8,118,167 B2 | 2/2012 | Togashi et al. | ............ | 206/534.1 |
| 10,279,103 B2 * | 5/2019 | Okihara | .............. | A61M 5/3134 |

(Continued)

FOREIGN PATENT DOCUMENTS

| | | |
|---|---|---|
| JP | 2014-517741 A | 7/2014 |
| JP | 2021132854 * | 2/2020 |

(Continued)

OTHER PUBLICATIONS

International Search Report mailed Dec. 19, 2023, issued to the corresponding PCT Application No. PCT/JP2023/041181.

(Continued)

*Primary Examiner* — King M Chu
(74) *Attorney, Agent, or Firm* — Stein IP, LLC

(57) ABSTRACT

To provide a transport container capable of stably holding a medical device. Provided is a transport container for a medical device, which includes a bottom, a body, and an opening, is formed with a flange which is formed so as to extend outward from part or the entirety of a peripheral edge portion of the body, and is formed, on the bottom, with an engagement portion to be engaged with a holder holding the medical device. Also, provided is, e.g., a transport container having a holder, which includes the holder holding a medical device and a transport container for the medical device.

9 Claims, 7 Drawing Sheets

(58) Field of Classification Search
USPC ................ 206/366, 439, 438, 364, 370, 443
See application file for complete search history.

(56) References Cited

U.S. PATENT DOCUMENTS

| | | | | |
|---|---|---|---|---|
| 11,161,671 B2 | 11/2021 | Yoshida | | B65D 25/108 |
| 11,547,518 B2 | 1/2023 | Yoshida | | A61B 50/30 |
| 2012/0118777 A1* | 5/2012 | Kakiuchi | | A61M 5/002 29/428 |
| 2021/0016950 A1* | 1/2021 | Yoshida | | A61M 5/008 |
| 2021/0268169 A1 | 9/2021 | Okihara | | A61M 5/002 |

FOREIGN PATENT DOCUMENTS

| | | | |
|---|---|---|---|
| JP | 2021-132854 | A | 9/2021 |
| WO | WO 2012/143533 | A1 | 10/2012 |
| WO | WO 2014/049715 | A1 | 4/2014 |
| WO | WO 2021/009890 | A1 | 1/2021 |

OTHER PUBLICATIONS

Extended European Search Report dated May 9, 2025, issued by the European Patent Office in corresponding application EP 23861712.0.

* cited by examiner

[FIG. 1]
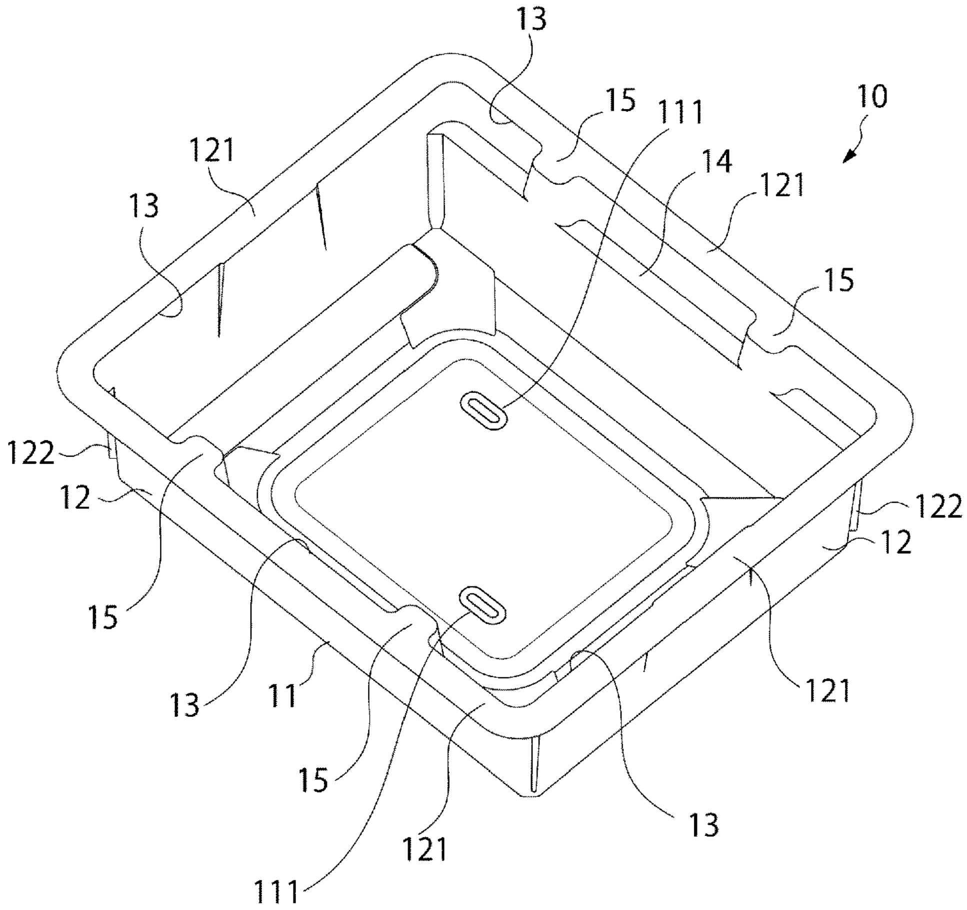
[FIG. 2]
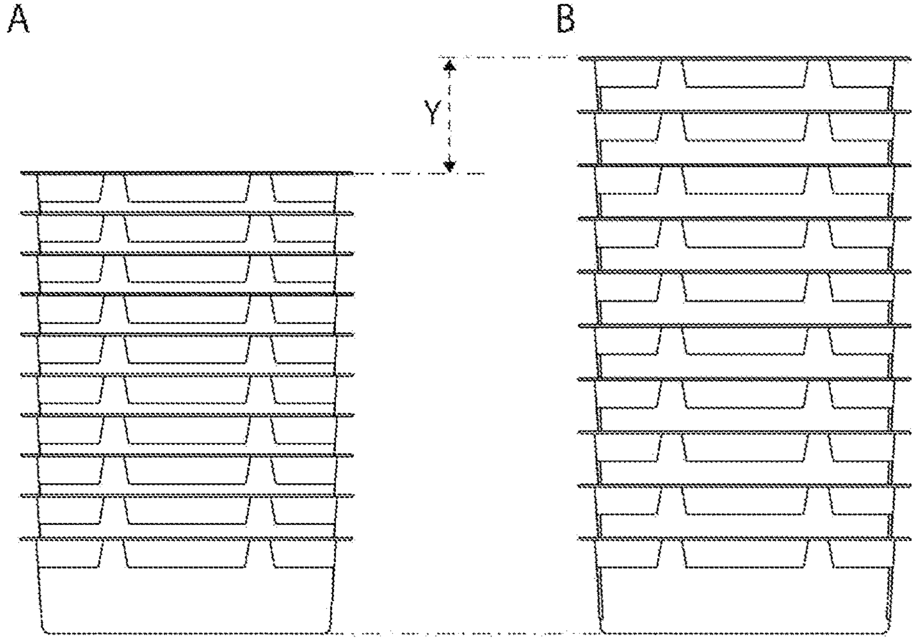

[FIG. 3]
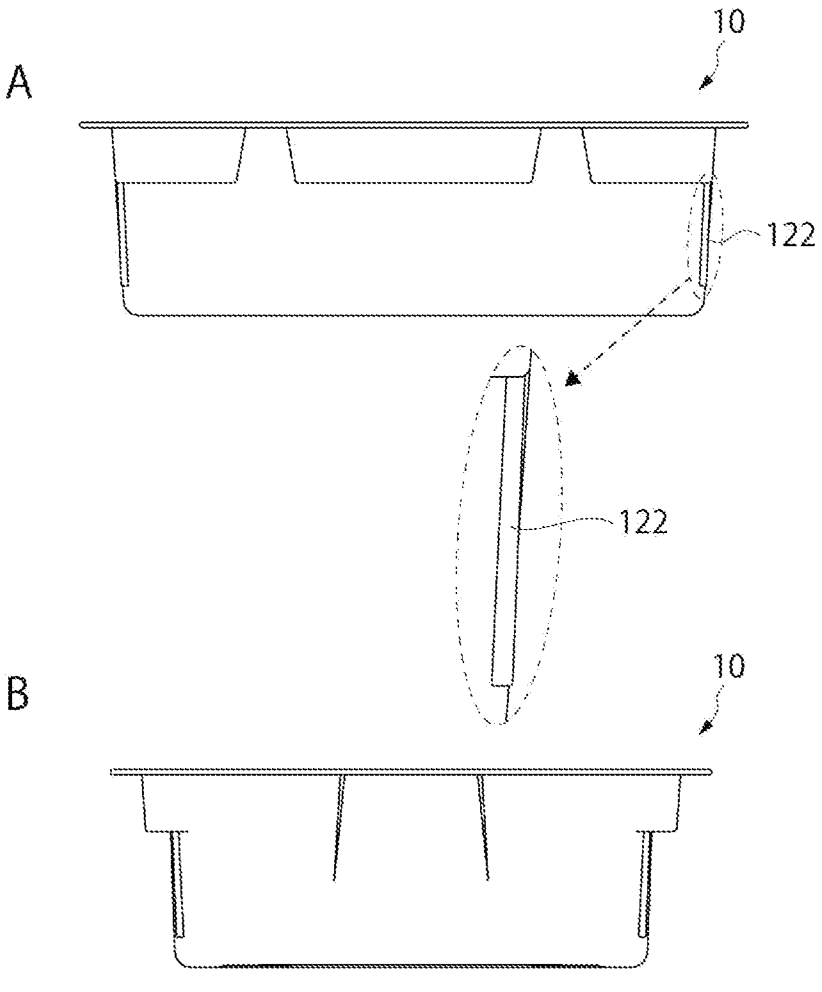

[FIG. 4]
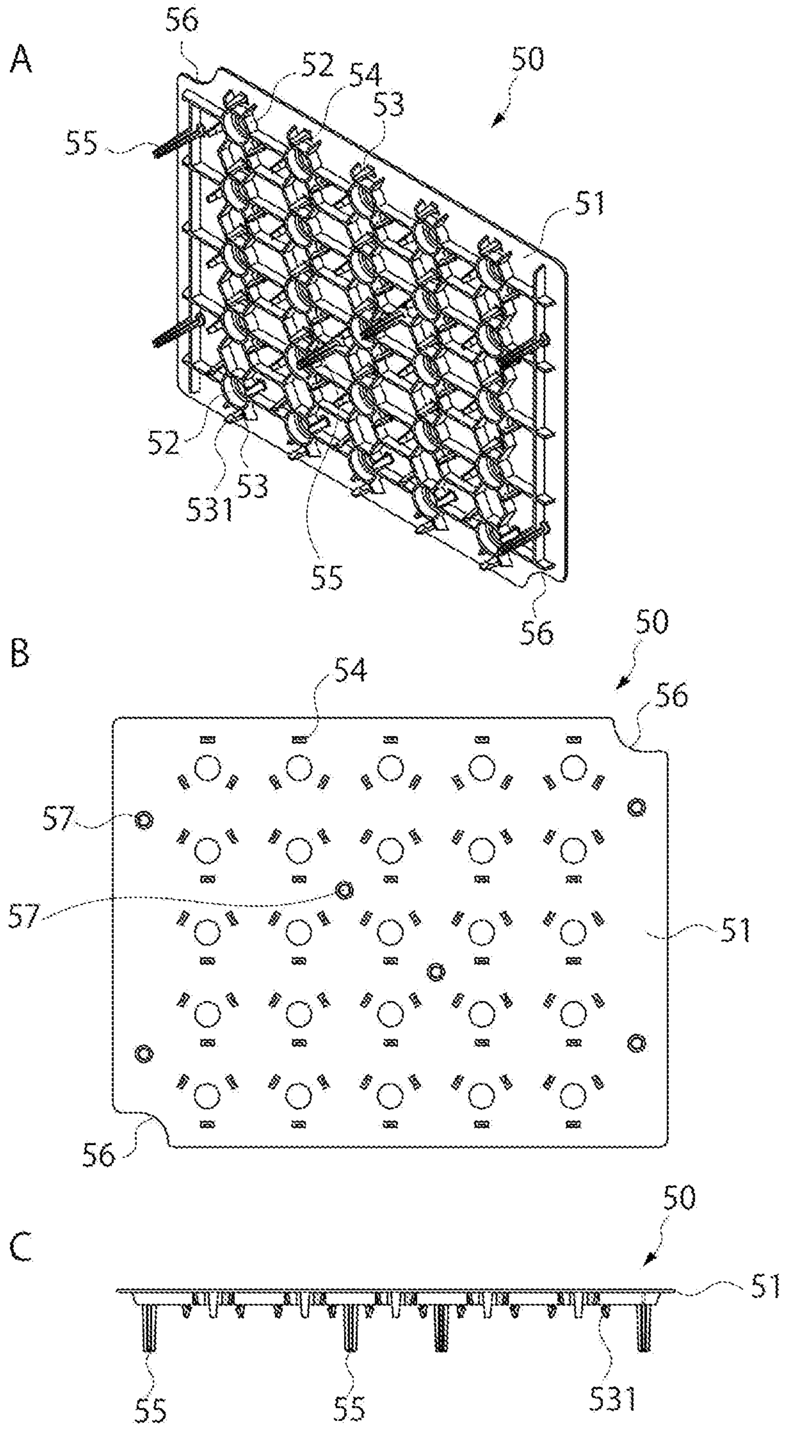

[FIG. 5]
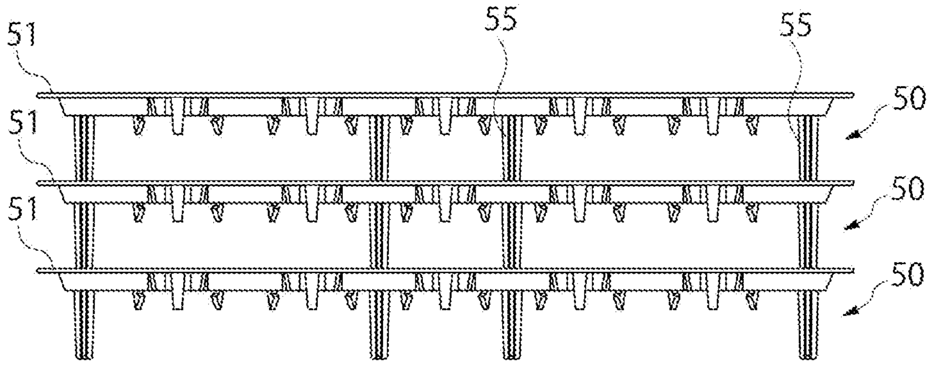
[FIG. 6]
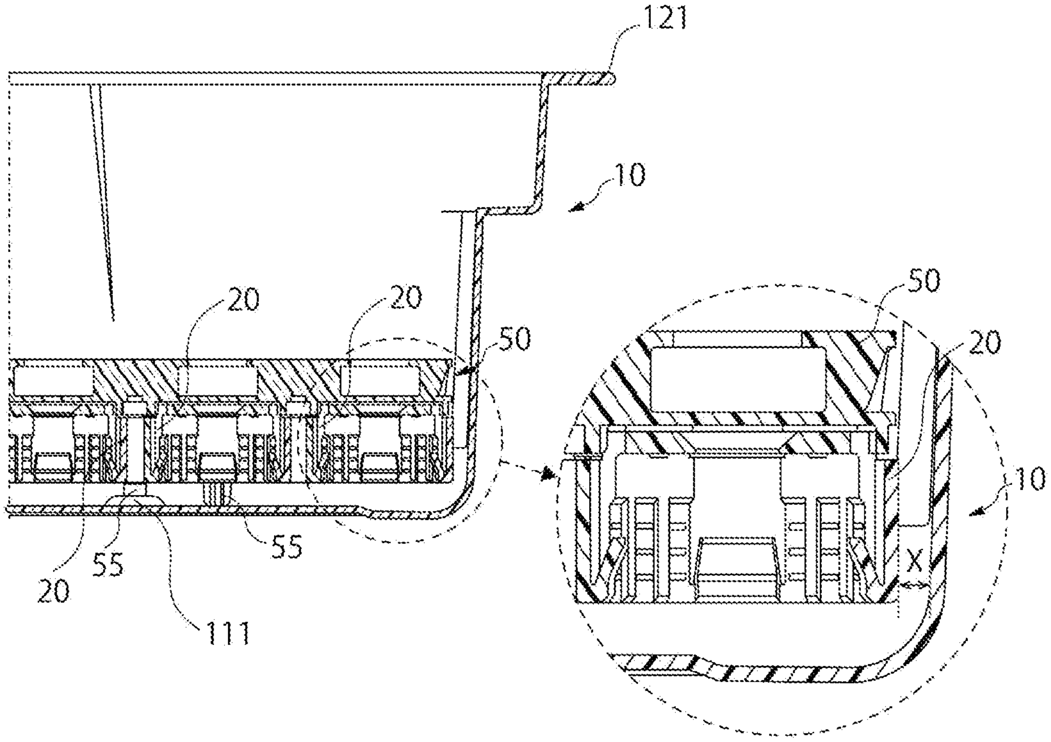

[FIG. 7]
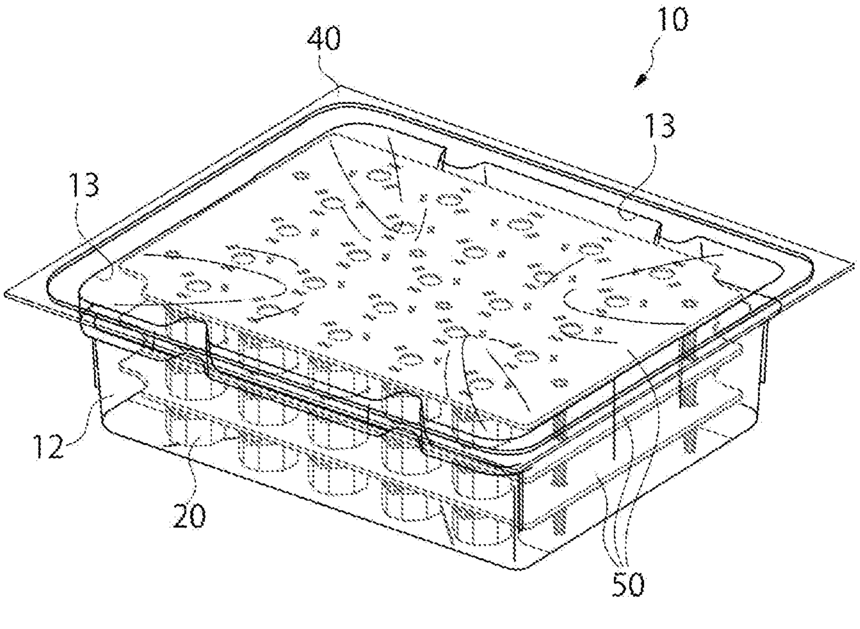

[FIG. 8]
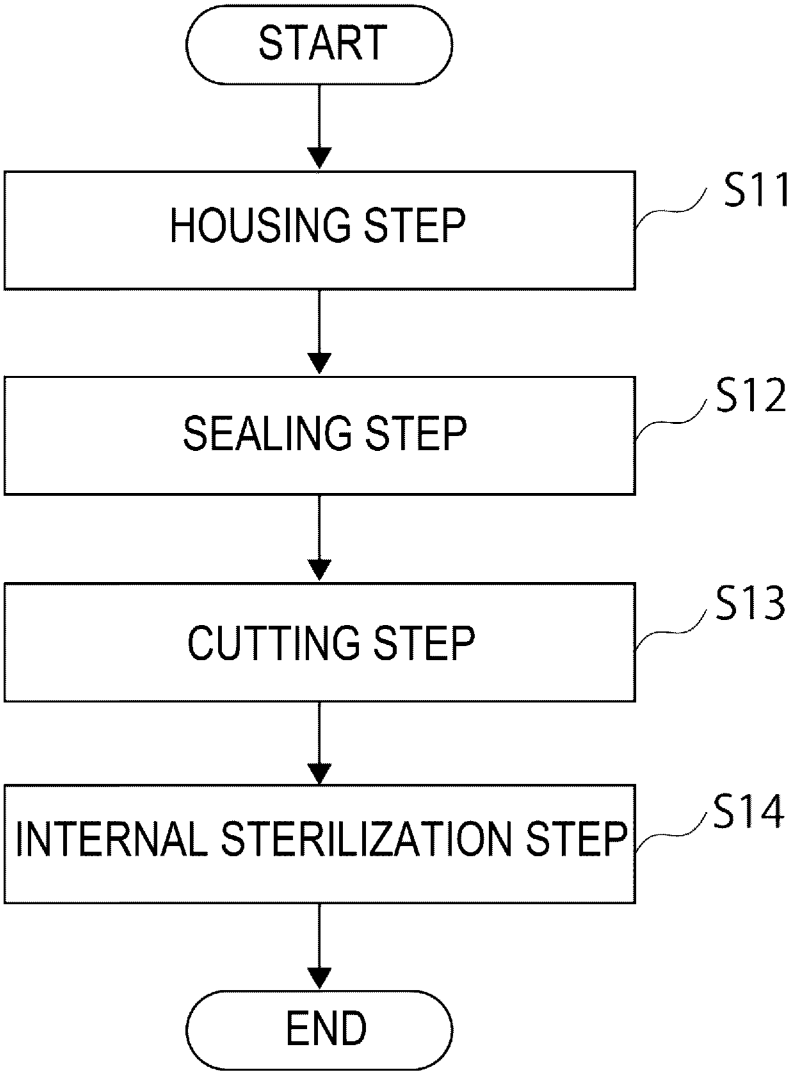

[FIG. 9]
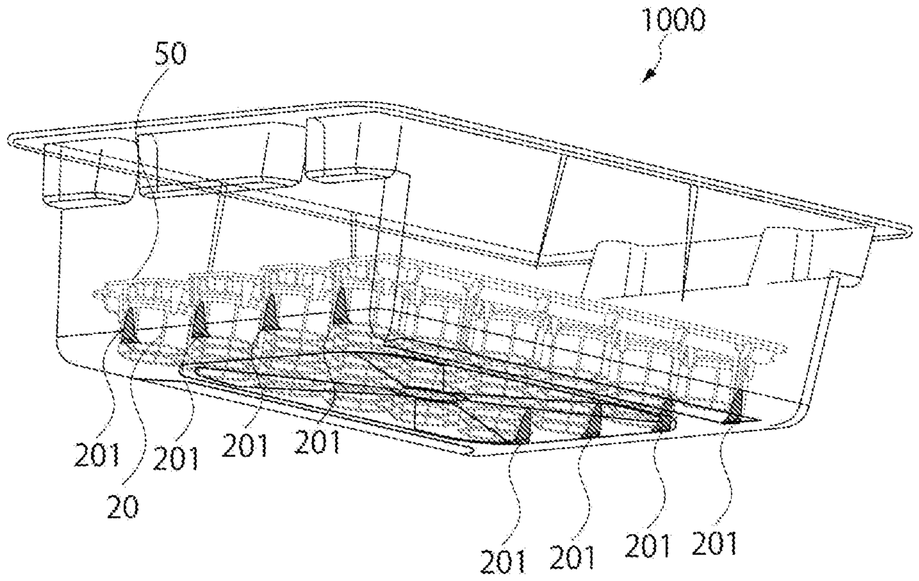

TRANSPORT CONTAINER

CROSS-REFERENCE TO RELATED APPLICATIONS

This application is a national stage of International Application No. PCT/JP2023/041181, filed Nov. 16, 2023, which claims the benefit of Japanese Application No. 2023-074548, filed Apr. 28, 2023, in the Japanese Patent Office, the disclosures of which are incorporated herein by reference.

TECHNICAL FIELD

The present invention relates to a transport container. More specifically, the present invention relates to a transport container, a transport container having a holder, and a packed transport container, which are capable of stably holding a medical device.

BACKGROUND ART

Generally, a medical device is sterilized with housed in a container, and is transported and stored in a sterilized state. However, there is a probability that a sanitary problem is caused because the medical device itself is damaged due to vibration of the medical device in the container upon transport or microparticles are caused by scratching or friction due to contact of, e.g., the medical device or a holder holding the medical device with the inner surface of the container.

In order to solve the above-described problem, there has been proposed a method for reducing vibration of the medical device upon transport by fixing the medical device in the container. For example, PTL 1 discloses, as a medical equipment container transportable with included medical equipment fixed, a medical equipment container configured such that a holder holding at least one piece of medical equipment is included in a container body having an opening at an upper portion and the opening is sealed with a gas impermeable film. The medical equipment container is characterized in that the internal pressure of the medical equipment container is lower than an atmospheric pressure.

CITATION LIST

Patent Literature

PTL 1: WO2021/009890

SUMMARY OF INVENTION

Technical Problem

However, the related art is not enough yet, and there has been a situation where further development is demanded not only for a method in which a medical device is fixed with included in a holder as described in PTL 1, but also for a transport container for transporting a medical device.

For this reason, the present invention is mainly intended to provide a transport container capable of stably holding a medical device.

Solution to Problem

That is, the present invention provides a transport container for a medical device, which includes a bottom, a body, and an opening, is formed with a flange which is formed so as to extend outward from part or the entirety of a peripheral edge portion of the body, and is formed, on the bottom, with an engagement portion to be engaged with a holder holding the medical device.

The engagement portion may include a plurality of engagement portions.

The engagement portion may be in a raised shape having a recessed portion at the center. In this case, the engagement portion may in a substantially oval ring raised shape. In a case where the engagement portion is in the substantially oval ring raised shape, the aspect ratio of the recessed portion is Minor Axis:Major Axis=1:1.1 to 3.0. Moreover, in this case, when the engagement portion is in the substantially oval ring raised shape, the longitudinal direction of the opening and the major axis direction of the recessed portion may be the same identical direction.

In a case where the engagement portions include two engagement portions, the two engagement portions may be formed on a substantially diagonal line.

In the transport container according to the present invention, part of the body may have a raised portion.

The present invention also provides a transport container having a holder, which includes the holder holding a medical device and a transport container for the medical device, which includes a bottom, a body, and an opening, is formed with a flange which is formed so as to extend outward from part or the entirety of a peripheral edge portion of the body, and is formed, on the bottom, with an engagement portion to be engaged with the holder.

Further, the present invention also provides a packed transport container including the transport container having the holder and a lid detachably thermally bonded to the flange of the transport container.

Advantageous Effects of Invention

According to the present invention, the transport container capable of stably holding the medical device can be provided.

Note that advantageous effects are not limited to those described here and may be any of the advantageous effects described in the present specification.

BRIEF DESCRIPTION OF DRAWINGS

FIG. 1 is a perspective view showing one exemplary embodiment of a transport container 10 according to the present invention.

FIG. 2A is a view showing a state in which conventional transport containers 1000 are stacked on each other, and FIG. 2B is a view showing a state in which the transport containers 10 according to the present invention are stacked on each other.

FIG. 3A is a view of the transport container 10 from the side of a bottom 11 in the longitudinal direction thereof, and FIG. 3B is a view of the transport container 10 from the side of the bottom 11 in the lateral direction thereof.

FIGS. 4A to 4C are views showing one exemplary embodiment of a holder 50.

FIG. 5 is a view showing a state in which the holders 50 are stacked on each other.

FIG. 6 is a view showing a state in which part of the holder 50 is engaged with an engagement portion 111 of the transport container 10.

FIG. 7 is a perspective view showing one exemplary embodiment of a packed transport container 10 according to the present invention.

FIG. 8 is a flowchart showing one example of a method for producing the packed transport container 10 according to the present invention.

FIG. 9 is a perspective view showing one exemplary embodiment of a conventional transport container 1000.

DESCRIPTION OF EMBODIMENTS

Hereinafter, a preferred embodiment of the present invention will be described with reference to the drawings.

The embodiment described below is one representative exemplary embodiment of the present invention, and is not intended to interpret the scope of the present invention as a narrower scope.

1. Transport Container 10

FIG. 1 is a perspective view showing one example of an embodiment of a transport container 10 according to the present invention. The transport container 10 according to the present embodiment is a container for transporting a medical device 20, which has a bottom 11, a body 12, and an opening 13, is formed with a flange 121 which is formed so as to extend outward from part or the entirety of a peripheral edge portion of the body 12, and is formed, on the bottom 11, an engagement portion 111 to be engaged with a holder 50 holding the medical device 20.

Note that in the present embodiment, the holder 50 and the medical device 20 are not necessarily included in the scope of the transport container 10 according to the present embodiment, and the transport container 10 can be distributed alone.

In the present specification, the "medical device" is a tool used in a medical field, such as a medicine container, a medicine container rubber plug, a cap, a syringe, a barrel (syringe barrel), a piston, a syringe needle, a vial, a test tube, and a tube (including a microtube), and broadly includes those housable in the transport container 10 according to the present embodiment. Moreover, in the present embodiment, the "holder" is a tool for holding the medical device 20, and broadly includes those housable in the transport container 10 according to the present embodiment. Note that the holder 50 will be described in detail in "2. Transport container 10 having holder 50."

The shape of the transport container 10 is not particularly limited, but for example, can be a box shape. The box shape includes, for example, a shape in which the shape of the bottom 11 is a substantially circular shape, a substantially oval shape, or a substantially polygonal shape such as a substantially triangular shape or a substantially quadrangular shape (including a substantially rectangular shape), but is preferably the substantially rectangular shape in the present embodiment. Note that in a case where the shape of the bottom 11 is the substantially polygonal shape in the present embodiment, a corner thereof may be designed as a round corner.

The material of the transport container 10 is preferably selected in terms of, e.g., the material being non-toxic and clean, various sterilization methods being applicable to the material, and the material having light resistance and weather resistance. Further, in a case where the inside of the transport container 10 needs to be maintained under a more negative pressure than an atmospheric pressure, the material is preferably selected also considering oxygen permeability. Specifically, the material includes, but not particularly limited to, polypropylene, polycarbonate, polyethylene, and high-impact polystyrene, for example. The transport container 10 can be produced in such a manner that such a material is processed by a conventional well-known method.

Note that the material of the transport container 10 may have transparency or translucency, but is not particularly limited in the present technique.

FIG. 9 is a perspective view showing one example of an embodiment of a conventional transport container 1000. In the conventional transport container 1000, for example, there is a probability that due to movement of the above-described medical device 20 (including one held by the holder 50) upon, e.g., transport or use, the medical device 20 contacts the inner surface of the transport container 1000 and microparticles are caused due to scratching or friction. Particularly, depending on the type of medical device 20, the medical device 20 has, e.g., a claw or a raised portion 201 on a side peripheral surface in many cases, and in these cases, the probability of the contact is high.

In response to this problem, the bottom 11 of the transport container 10 according to the present invention is formed with the engagement portion 111 to be engaged with the holder 50 holding the medical device 20. With this configuration, the movement of the medical device 20 upon, e.g., transport or use is controlled so that the contact of, e.g., the medical device 20 or the holder 50 holding the medical device 20 with the inner surface of the transport container 10 can be prevented and the medical device 20 can be stably held.

The shape of the engagement portion 111 is not particularly limited as long as the engagement portion 111 can be engaged with the holder 50, and can be designed appropriately to fit a conventional well-known engagement mechanism such as a screw mechanism, a snap-fit, or other conventional mechanisms. Moreover, the holder 50 and the engagement portion 111 are preferably detachably formed. With this configuration, the holder 50 can be easily taken out of the transport container 10, leading to improvement in usability.

As shown in FIG. 1, the engagement portion 111 preferably includes a plurality of engagement portions 111 such as two, three, or four or more engagement portions 111, and two engagement portions 111 are particularly preferably formed as shown in FIG. 1. The inventor of the present application has found, in a course of intensively conducting experiment and study on the present invention, that there is no difference in stable holding of the medical device 20 between a case of two engagement portions 111 being formed and a case of three or more engagement portions 111 being formed. Thus, the two engagement portions 111 are formed so that advantageous such as cost reduction and yield rate improvement can be obtained while the medical device 20 is stably held.

In the case of the two engagement portions 111, the two engagement portions 111 are preferably formed on a substantially diagonal line. With this configuration, as compared to a case of the engagement portions 111 being not formed on the substantially diagonal line, the movement of the medical device 20 upon, e.g., transport or use can be more controlled, and the medical device 20 can be more stably held.

A specific shape of the engagement portion 111 includes, for example, a raised shape, a recessed shape, or a partially-combined shape thereof, and the raised shape and/or the recessed shape may include, for example, a substantially circular shape, a substantially oval shape, and a substantially polygonal shape such as a substantially triangular shape or a substantially quadrangular shape (including a substantially rectangular shape). Moreover, the engagement portion 111 is not necessarily in, e.g., a continuously-formed annular raised shape and/or recessed shape as described later, and may be in, e.g., a non-continuously-formed raised shape and/or recessed shape with a cutout. Further, in the present embodiment, in a case where the raised shape and/or the recessed shape of the engagement portion 111 are the substantially polygonal shape, a corner thereof may be designed as a round corner.

The specific shape of the engagement portion 111 is preferably a raised shape having a recessed portion at the center. The recessed portion is provided at the center so that the engagement portion 111 can be easily engaged with, e.g., a support 55 of the holder 50 described later.

A more specific shape of the engagement portion 111 is preferably a substantially circular ring raised shape such as a substantially oval ring raised shape, and particularly preferably a substantially oval ring raised shape shown in FIG. 1. Such a shape is employed so that the engagement portion 111 can be more easily engaged with, e.g., the support 55 of the holder 50 described later. Particularly, the substantially oval ring raised shape is employed so that as compared to the case of the substantially circular ring raised shape, play can be formed, excessive demand for dimensional accuracy for the support 55 of the holder 50 can be avoided, easiness in housing the later-described holder 50 in the transport container 10 can be ensured, and the usability can be improved. Moreover, resistance against impact due to, e.g., shaking upon transport or use can be obtained.

In a case where the engagement portion 111 is in the substantially oval ring raised shape, the aspect ratio of the recessed portion in an oval shape is preferably Minor Axis:Major Axis=1:1.1 to 3.0 and more preferably Minor Axis:Major Axis=1:1.3 to 2.8. With Minor Axis:Major Axis=1:1.1 or more, the recessed portion is not in a substantially circular shape, but can be in the substantially oval shape. As a result, the above-described play upon transport can be formed. Moreover, with Minor Axis:Major Axis=1:3.0 or less, a failure to handle, e.g., shaking upon transport or use due to excessive play can be prevented.

In a case where the engagement portion 111 is in the substantially oval ring raised shape, the longitudinal direction of the opening 13 and the major axis direction of the recessed portion are preferably the same direction. With this configuration, the contact of, e.g., the medical device 20 or the holder 50 holding the medical device 20 with the inner surface of the transport container 10 can be more prevented, and the medical device 20 can be more stably held.

FIG. 2A is a view showing a state in which the conventional transport containers 1000 are stacked on each other, and FIG. 2B is a view showing a state in which the transport containers 10 according to the present invention are stacked on each other. The transport container 10 according to the present invention preferably has a raised portion 122 on part of the body 12. With this configuration, when the transport containers 10 are stacked on each other, a clearance (see Y in FIG. 2) in an upper-lower direction can be ensured as compared to the conventional transport container 1000. A space into which, e.g., an arm of a machine enters is ensured so that the transport container 10 can be easily taken out in a state of the transport containers 10 being stacked on each other and the usability can be improved. Moreover, excessive fitting and contact between the transport containers 10 can be prevented.

FIG. 3A is a view of the transport container 10 from the side of the bottom 11 in the longitudinal direction thereof, and FIG. 3B is a view of the transport container 10 from the side of the bottom 11 in the lateral direction thereof. Note that in a case where the transport container 10 is in the box shape shown in FIG. 1 and the bottom 11 is in the substantially rectangular shape, the raised portion 122 is preferably provided at each of the four corners of the substantially rectangular shape. Preferably in this case, the raised portion 122 protrudes from the side of the substantially rectangular shape in the longitudinal direction thereof, and does not protrude from the side in the lateral direction. With this configuration, the raised portion 122 does not protrude from the side in the lateral direction so that, e.g., the arm of the machine can easily enter from the side in the lateral direction and the usability can be improved.

Hereinafter, other portions of the transport container 10 according to the present embodiment will be described in detail with reference to FIG. 1, but the present technique is not limited to this structure.

As described above, the transport container 10 of the embodiment shown in FIG. 1 has the bottom 11, the body 12, and the opening 13, is formed with the flange 121 which is formed so as to extend outward from part or the entirety of the peripheral edge portion of the body 12, and is formed, on the bottom 11, with the engagement portion 111 to be engaged with the holder 50 holding the medical device 20. For example, a lid 40 may be thermally bonded to the flange 121, and in this manner, the opening 13 can be sealed.

As shown in FIG. 1, the transport container 10 can include, in the longitudinal direction of the transport container 10, a step 14 provided so as to horizontally protrude inward from a position apart toward the bottom 11 (lower direction) from the flange 121 positioned at the upper end by a predetermined length. The step 14 can be provided across the entire periphery (side peripheral portion) of the transport container 10. The step 14 is provided so that when a user or the machine grips the outside of the transport container 10, e.g., a finger or the arm of the machine can be hooked on the step 14, and therefore, the transport container 10 (including a case of the transport container 10 having, e.g., the holder 50 therein) can be stably gripped.

Further, as shown in FIG. 1, the transport container 10 can include, on the side peripheral portion, a protrusion 15 protruding inward. In a case where there is a clearance between the holder 50 described later and the side peripheral portion, the clearance is filled with the protrusion 15 so that vibration of the holder 50 in the transport container 10 can be reduced. Note that in FIG. 1, the protrusion 15 is provided on the side peripheral portion between the flange 121 and the step 14, and the number of protrusions 15 is two on each of a pair of opposing surfaces of the side peripheral portion, i.e., four in total. However, the position of the protrusion 15 and the number of protrusions 15 in the present technique are not limited to above.

2. Transport Container 10 Having Holder 50

The transport container 10 having the holder 50 according to the present embodiment includes at least the holder 50 holding the medical device 20 and the transport container 10 for the medical device 20 as described above. The transport container 10 for the medical device 20 is similar to one described in "1. Transport container 10," and therefore, description thereof will be omitted here.

In the transport container 10 having the holder 50 according to the present embodiment, the holder 50 holding the medical device 20 is preferably included inside the transport container 10. This container can be produced through a housing step of housing the holder 50 holding the medical device 20 through the opening 13 of the formed transport container 10.

The shape of the holder 50 can be designed appropriately according to, e.g., the type and size of the medical device 20, and therefore, is not particularly limited. One example will be described with reference to FIGS. 4 and 5. FIG. 4A is a perspective view showing the holder 50, FIG. 4B is a plan view showing the holder 50, and FIG. 4C is a front view showing the holder 50.

As shown in FIGS. 4A to 4C, the holder 50 includes a plate-shaped base 51. The shape of the base 51 includes, for example, a substantially polygonal shape, a substantially circular shape, and a substantially oval shape in addition to a substantially rectangular shape shown in FIG. 4, and can be selected appropriately according to, e.g., the shape of the transport container 10 housing the holder 50.

As shown in FIG. 4A, the holder 50 includes a plurality of tubular portions 52 protruding from the base 51. The number of provided tubular portions 52 and the interval between adjacent ones of the tubular portions 52 are not particularly limited, and can be set appropriately according to, e.g., the size of the medical device 20 to be held.

As shown in FIGS. 4A and 4C, the base 51 can include, around the tubular portion 52, a locking protrusion 53 protruding from the base 51 and having a locking claw 531 at a tip end portion. In a case where the base 51 is positioned on the upper side, the locking claw 531 protrudes downward beyond the tubular portion 52. Note that in FIG. 4A, three locking protrusions 53 are arranged around each tubular portion 52, but the number of arranged locking protrusions 53 in the present technique is not limited thereto.

The holder 50 can stably hold the medical device 20 with the locking claws 531 at plural locations (for example, three locations). Moreover, in a case where the medical device 20 is a rubber plug-embedded cap, it can be configured such that when the mouth of a medicine container is plugged, the rubber plug-embedded cap is reliably released from the locking claw 531 holding such a cap.

As shown in FIGS. 4A and 4B, the base 51 can include a through-hole 54. With the through-hole 54, sterilization fluid favorably spreads inside the container, and a sterilization efficiency is improved. The shape of the through-hole 54 includes, but not particularly limited to, a substantially rectangular shape, a substantially polygonal shape, a substantially circular shape, and a substantially oval shape, for example. Note that in FIGS. 4A and 4B, three through-holes 54 are arranged around each tubular portion 52, but the arrangement position of the through-hole 54 and the number of arranged through-holes 54 in the present technique are not limited thereto.

As shown in FIGS. 4A and 4B, the base 51 can include a cutout 56 with such a size that a finger can be inserted into the cutout 56. With this configuration, a process of housing the holder 50 in the transport container 10 and a process of taking the holder 50 out of the transport container 10 can be more easily performed. Moreover, for example, in a case where a process of stacking the holder 50 holding a cap on the holder 50 holding a vial or a process of moving the holders 50 stacked on each other is performed by plural pieces of machine equipment, the cutout 56 can be provided for the purpose of preventing contact between the pieces of machine equipment. Further, the position of the holder 50 can be accurately grasped by detection of the cutout 56 by, e.g., an image inspection machine, and therefore, abnormal transport and misalignment of the holder 50 can be promptly sensed and equipment stop time due to the abnormal transport or the misalignment can be reduced. Note that in FIGS. 4A and 4B, the cutouts 56 are provided at two locations on a diagonal line among the four corners of the base 51, but the position of the cutout 56 and the number of cutouts 56 in the present technique are not limited thereto.

As shown in FIGS. 4A and 4C, the base 51 can include the support 55 protruding from the base 51. In a case where the base 51 is positioned on the upper side, the support 55 protrudes downward beyond the tubular portion 52 and the locking protrusion 53. As described later, in a case where the holders 50 are stacked on each other, the support 55 can prevent the holders 50 adjacent to each other in the upper-lower direction from contacting each other. Moreover, a clearance can be formed between the holders 50 adjacent to each other in the upper-lower direction, and therefore, the sterilization fluid favorably spreads inside the container and the sterilization efficiency is improved. The support 55 is provided so that the contact with the medical device 20 can be prevented. Moreover, contact of the medical device 20 held by the holder 50 with, e.g., the bottom of the container or moisture accumulated on the bottom can be prevented, and therefore, the medical device 20 can be maintained clean.

FIG. 5 is a view showing a state in which the holders 50 are stacked on each other. As shown in FIG. 5, the holders 50 can be stacked on each other. In this case, the base 51 preferably includes a coupling hole 57 as shown in FIG. 4B. The tip end of the support 55 is fitted in the coupling hole 57 of the already-mounted holder 50, and in this manner, the holders 50 can be stably stacked on each other. The shapes of the support 55 and the coupling hole 57 are not particularly limited, and arbitrary shapes can be employed.

FIG. 6 is a view showing a state in which part of the holder 50 is engaged with the engagement portion 111 of the transport container 10. Specifically, the lowermost support 55 is engaged with the engagement portion 111, and in this manner, the movement of the medical device 20 loaded in the holder 50 upon, e.g., transport or use is controlled. Thus, the contact of, e.g., the medical device 20 or the holder 50 holding the medical device 20 with the inner surface of the transport container 10 can be prevented, and the medical device 20 can be stably held. Note that in FIG. 5, three holders 50 holding the medical devices 20 are stacked on each other in the upper-lower direction, but the number of holders 50 is not limited thereto and may be one or more.

Note that a distance X (distance to the medical device 20 held by the holder 50 or the holder 50 in the transport container 10) in the partially-enlarged view of FIG. 6 is not particularly limited, but can be designed to 2.0 mm or less or 1.5 mm or less because the engagement portion 111 makes it possible to control the movement of the medical device 20 upon, e.g., transport or use. Thus, the volume of the transport container 10 can be reduced. As a result, a cost can be reduced, and more medical devices 20 can be transported.

The material of the holder 50 is preferably selected in terms of, e.g., the material being non-toxic and clean, various sterilization methods being applicable to the material, and the material having light resistance and weather resistance. Further, the material is preferably selected in terms of, e.g., the shape, material, required quality, function, and strength of the medical device 20. Specifically, the material includes, but not particularly limited to, polypropylene, polycarbonate, polyethylene, and polyacetal, for example. The holder 50 can be produced in such a manner that such a material is processed by a conventional well-known method. Note that the material of the holder 50 may have transparency or translucency, but is not particularly limited in the present technique.

3. Packed Transport Container 10

A packed transport container 10 according to the present invention includes at least the transport container 10 having the holder 50 as described above and the lid 40 detachably thermally bonded to the flange 121 of the transport container 10. The transport container 10 having the holder 50 is similar to one described in "2. Transport container 10 having holder 50," and therefore, description thereof will be omitted here.

FIG. 7 is a perspective view showing one example of an embodiment of the packed transport container 10 according to the present invention. In the present embodiment, the inside of the transport container 10 is preferably under the more negative pressure than the atmospheric pressure. Thus, in FIG. 7, the lid 40 covering the opening 13 of the transport container 10 is bent inward of the transport container 10, and the bent portion of the lid 40 presses the holder 50. Note that in the present specification, the "atmospheric pressure" is a standard atmospheric pressure, and is specifically 1013.25 hPa.

In a case where the produced packed transport container 10 is under environment with a pressure lower than the atmospheric pressure due to, e.g., aerial transport, the internal pressure of the container may be equal to or lower than the pressure during the aerial transport. The upper limit of the internal pressure of the transport container 10 is preferably 1013 hPa or less and more preferably 980 hPa. The lower limit of the pressure may be adjusted appropriately such that the transport container 10 is not deformed or damaged, and is preferably 400 hPa or more.

The medical device 20 shown in FIG. 7 is pressed by the lid 40 through the holder 50. Thus, the holder 50 and the medical device 20 are fixed with sandwiched between the bottom 11 of the transport container 10 and the lid 40, and therefore, are less likely to vibrate during transport. The transport container 10 is packed with the lid 40 so that an exterior package of the packed transport container 10 can be sterilized. An exterior package sterilization method is not particularly limited, and a conventional well-known method by which a sterilization effect is obtained can be selected.

The lid 40 has a gas impermeable film, and is detachably thermally bonded to the flange 121 of the transport container 10. In this manner, as shown in FIG. 7, the opening 13 is sealed. The lid 40 is a sheet-shaped member, and is not a bag-shaped member such as a vacuum bag. Note that the material of the lid 40 may have transparency or translucency, but is not particularly limited in the present technique.

A method for thermally bonding the lid 40 and the flange 121 to each other can be performed by a conventional well-known method. For example, the method includes a method in which the flange 121 is melted with heat and is bonded to the lid 40, a method in which an adhesive layer forming the lid 40 is melted with heat and is bonded to the flange 121, and a method in which the lid 40 and the flange 121 are bonded to each other with an adhesive (e.g., hot-melt adhesive).

The configuration of the lid 40 is not particularly limited as long as the lid 40 has the gas impermeable film, but for example, can be a stack including (A) a gas impermeable layer, (B) an anchor coat layer, and (C) an adhesive layer in this order from the upper layer (outside). Hereinafter, a preferred material of each layer will be described in (1) to (4) in a case where a preferred configuration of the lid 40 is expressed as "(A) Gas Impermeable Layer/(B) Anchor Coat Layer/(C) Adhesive Layer" in this order from the upper layer. (1) to (3) are the lid 40 with a three-layer structure, and (4) is the lid 40 with a five-layer structure.

(1) (A) Polyethylene Terephthalate/(B) Polyethylene/(C) Polyethylene-Based Resin (2) (A) Polyethylene Terephthalate/(B) Polyethylene/(C) Olefin-Based Resin Including Mixture of Polyethylene and Polyethylene Terephthalate (3) (A) Polyethylene Terephthalate/(B) Polyethylene/(C) Polypropylene-Based Resin (4) (A) Polyethylene Terephthalate/(B) Polyethylene/(B) Biaxially Oriented Nylon/(B) Polyethylene/(C) Polyethylene-Based Resin Note that the lid 40 may include (D) a gas permeable film in addition to (A) the gas impermeable layer, (B) the anchor coat layer, and (C) the adhesive layer described above.

Preferably, in formation of the lid 40, in a case of performing sterilization treatment using gas, (D) the gas permeable film is detachably thermally bonded to the flange 121, and thereafter, the gas impermeable film or the stack including (A) the gas impermeable layer, (B) the anchor coat layer, and (C) the adhesive layer is stacked and bonded thereto. In this manner, the inside of the transport container 10 can be sterilized using the gas, and the cleanness of the inside of the transport container 10 can be more enhanced. On the other hand, in a case of performing sterilization treatment using a radiation or an electron beam, (D) the gas permeable film is not necessary, and the gas impermeable film or the stack including (A) the gas impermeable layer, (B) the anchor coat layer, and (C) the adhesive layer is preferably stacked and bonded. A bonding method is not particularly limited, and a conventional well-known method such as a method in which bonding is performed with (C) the adhesive layer or a method in which bonding is performed with an adhesive can be used.

The thickness of the lid 40 can be selected appropriately according to the configuration and material thereof. For example, in a case where the lid 40 includes the stack having (A) the gas impermeable layer, (B) the anchor coat layer, and (C) the adhesive layer, the thickness of the lid 40 is preferably 50 μm to 150 μm and more preferably 70 μm to 100 μm. In a case where the lid 40 includes the stack having (A) the gas impermeable layer, (B) the anchor coat layer, and (C) the adhesive layer and (D) the gas permeable film, the thickness of the lid 40 is preferably 200 μm to 500 μm.

4. Method for Producing Packed Transport Container 10

FIG. 8 is a flowchart showing one example of a method for producing the packed transport container 10 according to the present invention.

In the production method according to the present embodiment, a housing step (Step S11) of housing the medical device 20 in the transport container 10 having the opening 13 and the flange 121 is first performed. The medical device 20 may be held by the holder 50. In this case, in Step S11, the holder 50 holding the medical device 20 is housed in the transport container 10.

Subsequently, a sealing step (Step S12) of sealing the opening 13 by detachably thermally bonding the lid 40 to the flange 121 and pressing the medical device 20 or the holder 50 holding the medical device 20 by the lid 40 by bringing the inside of the transport container 10 into the more negative pressure than the atmospheric pressure is performed. In Step S12, the internal pressure of the transport container 10 is decreased such that the lid 40 presses the medical device 20 or the holder 50 holding the medical device 20, and accordingly, the transport container 10 is under the more negative pressure than the atmospheric pressure.

Through Step S12, the lid 40 is thermally bonded to the transport container 10 in a state of directly pressing the medical device 20 or indirectly pressing the medical device 20 through the holder 50. In this manner, the packed transport container 10 is obtained with the medical device 20 fixed. A thermal bonding method is not particularly limited, and a conventional well-known method such as a method in which the flange 121 is melted with heat and is bonded to the lid 40, a method in which the adhesive layer of the lid 40 is melted with heat and is bonded to the flange 121, or a method in which the flange 121 and the lid 40 are bonded to each other with a component (e.g., adhesive such as a hot-melt adhesive) other than the flange 121 and the lid 40 can be used. Note that in Step S12, a specific treatment method in the present technique is not particularly limited as long as the opening 13 of the transport container 10 can be sealed and the medical device 20 can be pressed by the lid 40 as described above.

The production method according to the present embodiment preferably includes, after Step S12, a cutting step (Step S13) of cutting the lid 40. "After the sealing step" means the same timing as that of the sealing step or after the sealing step. That is, in the production method according to the present embodiment, the lid 40 is preferably cut at the same time as or after thermal bonding of the lid 40 to the flange 121 of the transport container 10. For example, when the packed transport container 10 is produced using the lid 40 larger than the outer shape of the transport container 10, such as a roll-shaped lid 40, a step of cutting the lid 40 in accordance with the shape of the transport container 10 is performed in some cases. The lid 40 is cut after the sealing step so that the lid 40 can be more reliably thermally bonded. Note that in the production method according to the present embodiment, Step S12 can be performed after Step S13. For example, in a case where the cut lid 40 is arranged under pressure-decreased environment together with, e.g., the transport container 10 and the lid 40 and the flange 121 are thermally bonded to each other, Step S12 may be performed after Step S13.

In the production method according to the present embodiment, an internal sterilization step (Step S14) of sterilizing the inside of the packed transport container 10 may be performed after Step S12. In a case of performing Step S13, Step S14 is preferably performed after Step S13. As a sterilization method in Step S14, radiation sterilization or electron beam sterilization is preferred, but the present technique is not limited thereto.

INDUSTRIAL APPLICABILITY

According to the present invention, a transport container capable of stably holding a medical device can be provided. Moreover, a transport container having a holder and a packed transport container can also be provided. The transport container according to the present invention is used so that movement of the medical device upon, e.g., transport or use can be controlled. As a result, contact of, e.g., the medical device or the holder holding the medical device with the inner surface of the transport container can be prevented, and the medical device can be stably held.

REFERENCE SIGNS LIST

10: Transport container
11: Bottom
111: Engagement portion

12: Body
121: Flange
122: Raised portion
13: Opening
14: Step
15: Protrusion
20: Medical device
40: Lid
50: Holder
1000: Conventional transport container
201: Claw or raised portion

The invention claimed is:

1. A transport container for a medical device held by a holder, comprising:
- a bottom;
- a body; and
- an opening,
- wherein a flange is formed so as to extend outward from part or an entirety of a peripheral edge portion of the body, and
- the bottom is formed with an engagement portion engageable with the holder holding the medical device, and the engagement portion is in a raised shape, with the raised shape having a recessed portion at a center.

2. The transport container according to claim 1, wherein the engagement portion includes a plurality of engagement portions.

3. The transport container according to claim 1, wherein the engagement portion is in a substantially oval ring raised shape.

4. The transport container according to claim 3, wherein an aspect ratio of the recessed portion is Minor Axis: Major Axis=1:1.1 to 3.0.

5. The transport container according to claim 3, wherein a longitudinal direction of the opening and a major axis direction of the recessed portion are an identical direction.

6. The transport container according to claim 2, wherein in a case where the engagement portions include two engagement portions, the two engagement portions are formed on a substantially diagonal line.

7. The transport container according to claim 1, wherein an external surface part of the body has a raised portion.

8. A transport container for a medical device, comprising:
- a holder holding the medical device; and
- a bottom;
- a body; and
- an opening
- wherein a flange is formed so as to extend outward from part or an entirety of a peripheral edge portion of the body and
- the bottom is formed with an engagement portion engageable with the holder, and the engagement portion is in a raised shape, with the raised shape having a recessed portion at a center.

9. A packed transport container comprising:
- the transport container having the holder according to claim 8; and
- a lid detachably thermally bonded to the flange of the transport container.

* * * * *